Dec. 31, 1963   A. M. JOHNSON ETAL   3,116,486
LUNEBERG LENS SYSTEM
Filed Dec. 29, 1961   2 Sheets-Sheet 1

Anton M. Johnson
Warren T. Harpster,
INVENTORS.

BY

Dec. 31, 1963  A. M. JOHNSON ETAL  3,116,486
LUNEBERG LENS SYSTEM
Filed Dec. 29, 1961  2 Sheets-Sheet 2

Anton M. Johnson
Warren T. Harpster,
INVENTORS.

BY 3,116,486
LUNEBERG LENS SYSTEM
Anton M. Johnson, Snyder, and Warren T. Harpster, Tonawanda, N.Y., assignors, by mesne assignments, to the United States of America as represented by the Secretary of the Army
Filed Dec. 29, 1961, Ser. No. 163,375
7 Claims. (Cl. 343—755)

This invention relates in general to microwave reflectors and antennas and in particular to a novel radar device which can be carried by a vehicle to provide a strong radar return signal to a radar source and a substantial increase in antenna gain.

It is well known in the radar art that the rounded surfaces of targets or vehicles being tracked provide small radar return signals to a radar source. The great majority of the radar energy incident on such objects will be dispersed by those surfaces which are not substantially flat and normal to the radar beam. To overcome this difficulty, beacons have been employed which provide strong radar return signals over a wide angle of incidence of the radar beam with the vehicle. One such beacon consists of a Luneberg lens sphere and a reflecting material disposed upon a portion of the surface of the sphere. The Luneberg lens sphere acts to focus all the electromagnetic waves incident upon one hemisphere to a focal point which is at the pole of the other hemisphere. The reflecting material positioned at the focal point acts to deflect all the radar energy back through the lens to the radar source. Because the reflecting material covers substantially more area than that of a point, radar energy can be impinging on the sphere from many directions without any loss of return signal to the radar source. That is, the vehicle carrying the beacon can be oriented in many positions with respect to the radar source and as long as the reflecting material is diametrically opposite the incidence there will be no loss in the magnitude of reflected energy.

The problems associated with radar reflecting capabilities from a vehicle are also related to antenna receiving capabilities. For instance, the gain of an antenna is directly related to the orientation of the antenna with respect to the transmitting source. Only when an antenna is cutting a maximum amount of the transmitted field will the orientation be the optimum one. As the antenna deviates from this orientation, gain or receiving capabilities decrease.

If the receiving capabilities can be optimized for the antenna system of a missile, other advantages can be realized beyond those which are apparent. Guidance and control of a missile from the ground by command signals becomes more practical and in many cases desirable with increased antenna receiving capabilities. Many of the guidance instruments which must be carried by a missile can be eliminated and a savings in weight can be realized. Reliability increases and because of the mechanical nature of gyros and other missile guidance instruments, accuracy can be improved with guidance from the ground. Other advantages will be realized in the following detailed description.

It is, therefore, a primary object of this invention to provide a simple and reliable electromagnetic device for receiving command signals from a remote transmitting source.

It is a further object of this invention to provide a simple and reliable electromagnetic means for acquisition and tracking of a vehicle by radar.

Another object of this invention is to provide a simple and reliable electromagnetic means for roll stabilization reference to a missile guidance system.

A further object of this invention is to provide a vehicle with a simple and reliable electromagnetic means having equal and strong receiving and reflecting capabilities over a wide angle of incidence of the electromagnetic wave with the vehicle.

According to the present invention, the foregoing and other objects are attained by providing adjacent the surface of a Luneberg lens sphere a pair of slotted wave guide antennas and a strip of dielectric material therebetween.

The invention, however, will be more fully understood through the following specification when taken in conjunction with the accompanying drawings in which.

Figure 1:
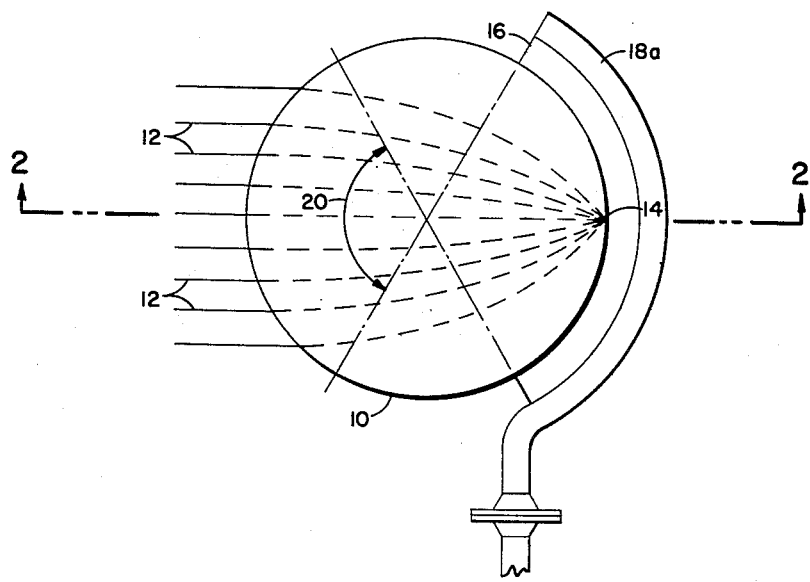
FIGURE 1 illustrates an elevation of the invention.
Figure 2:
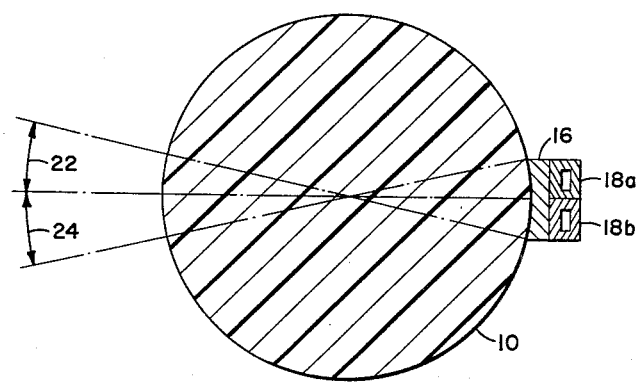
FIGURE 2 is a sectional view along line 2—2 of FIGURE 1.

With reference to FIGURE 1, electromagnetic waves 12 (radar waves, command signals, etc.) are incident on Luneberg lens sphere 10 from a transmitting source (not shown) and waves 12 are focused by lens 10 to point 14 on the opposite surface of the sphere from the incidence. Dielectric sheath 16 acts to reflect a portion of waves 12 back through lens 10 to the transmitting source and the reflected wave from point 14 follows a divergent path through lens 10 similar to the convergent path of entry of wave 12. The convergence of wave 12 and divergence of the reflected wave follow a path through lens 10 which is defined by the characteristics of a Luneberg lens. The reflected wave, upon leaving lens 10, follows the parallel path back to the transmitting source which wave 12 followed in approaching lens 10 and the remaining portion of wave 12 which is not reflected passes through sheath 16 to antennas 18a and 18b (FIGURE 2). The ratio of the magnitude of the reflected to the received wave is determined by the value of the dielectric constant of sheath 16. The wave received by antennas 18a and 18b is transmitted via suitable means to receiving equipment on board the vehicle.

It may be understood that sheath 16 can be eliminated from the disclosed device if reflecting capabilities are not required. Without sheath 16, antennas 18a and 18b would receive the maximum energy of the incident electromagnetic signal. The preferred embodiment, shown and described herein, employs sheath 16 since it is desired to disclose the maximum utility of the invention.

Angle 20 is the angle of the antenna lobe pattern in the elevation plane and waves 12 can be incident on lens 10 from any direction within the bounds of angle 20 without any decrease in the magnitude of reflecting and receiving capabilities. That is, if the disclosed device were rotated in a clockwise direction, waves 12 would be incident on the bottom of lens 10 and point 14, always being diametrically opposite the indicendence, would move to the upper end of shield 16. In this rotated orientation the magnitude of the reflected portion of wave 12 would be the same as that for the orientation shown in the figure and, because antennas 18a and 18b are of the slotted wave guide type, the magnitude of the received portion of wave 12 would also be the same. Therefore, if the disclosed device were carried by a missile, through a particular trajectory, no loss in the magnitude of the reflecting and receiving capabilities would result because of the change in position of the device with respect to the transmitting source.

FIGURE 2 shows the relationship of lens 10, sheath 16, and antennas 18a and 18b. Angles 22 and 24 are the approximate angles of the lobe patterns in the azimuth plane of antennas 18b and 18a respectively. The use of two long and narrow antennas is purely a matter of choice and design. Antennas 18a and 18b, being narrow, have small lobe patterns in the azimuth plane. The advantage and novel result of this design choice will be understood and appreciated in the following description, however, any number of antennas, in any size and shape, may be employed to provide similar and comparable results without deviating from the spirit and scope of this invention.

Figure 3:
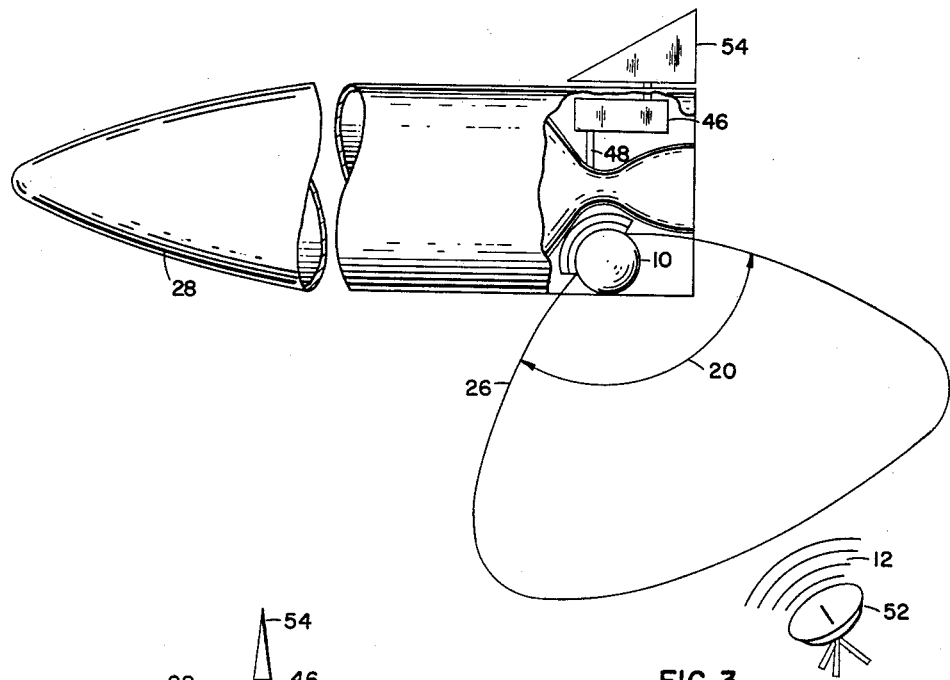
FIGURE 3 illustrates the device in a cut-out view of a missile and shows a diagrammatic view of the antenna elevation pattern.

A missile application of the invention is shown in FIGURE 3. Transmitter 52 emits waves 12 which are received and acted upon by the lens 10 in the disclosed manner. Antenna elevation lobe pattern 26 has a breadth shown by angle 20 and waves 12 may be incident on lens 10 from any direction with angle 20 in order for signals to be reflected and received. It can be seen from FIGURE 3 and lobe pattern 26 how a missile carrying the invention can be placed into a ballistic trajectory and follow that path for a considerable distance without any loss in reflecting or receiving capabilities for the device. Lens 10 is housed within the skin of missile 28 and received signals can be used to actuate fins 54 via wave guide 48 and control 46 or other suitable means as desired.

Figure 4:
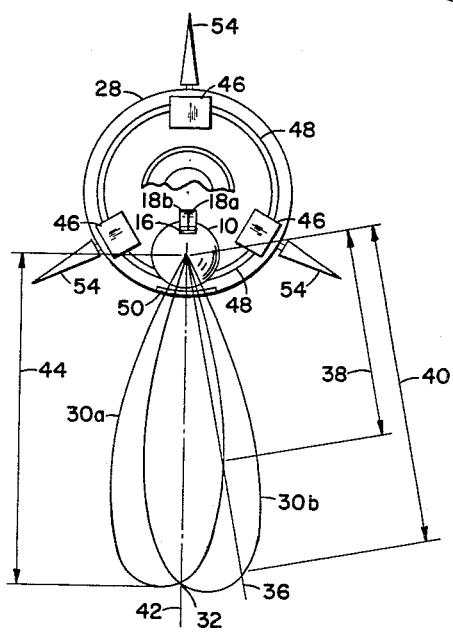
FIGURE 4 illustrates the device in cut-out end view of a missile and shows a diagrammatic view of the antenna azimuth pattern.

The missile application of FIGURE 3 is shown in an end view of missile 28 in FIGURE 4. In operation, if the transmitted beam is incident upon lens 10 along line 36, a small signal will be received by antenna 18a and a large signal by antenna 18b. This is obvious from the amount of lobe pattern in the azimuth plane which is cut by the transmitted wave. The amount of lobes 30a and 30b which is cut by the transmitted wave is proportional to distances 38 and 40, respectively. If the missile rolls in a counterclockwise direction, the radar wave will cut more and more of each lobe pattern. When the radar beam is cutting through the center of lobe 30b, antenna 18b will receive a maximum amount of signal. As the missile continues to roll, the signal to antenna 18b will decrease and that to antenna 18a will increase and when the radar beam is incident on lens 10 along line 42, equal signals will be received by both antennas and each will be proportional to distance 44. This critical point is significant for establishing a roll stabilization reference for the missile guidance control equipment. If the missile is to have a definite rate of roll while in flight, point 32, the intersection point of the two lobes, should cross the radar beam at the same rate. When a discrepancy occurs in the roll rate, either missile equipment or remote command signals can actuate fins 54 to compensate for the error. For instance, if missile 28 is to have a roll rate of one revolution per second and point 32 crosses the radar beam every 1.2 seconds, then an error of 0.2 seconds exists which can be compensated for in several ways. The first is accomplished on board the missile and is shown in FIGURE 4 by the structure of wave guide 48 and controls 46. When equal signals are received by antennas 18a and 18b, a trigger pulse could be generated by controls 46 to be compared with a preselected trigger pulse corresponding to the desired roll. The time discrepancy would then be employed to actuate fins 54. The second method would utilize either the reflected wave or a transmitted signal from antennas 18a and 18b to the ground. Equipment on the ground could then compare the actual with the desired roll rate and transmit command signals to antennas 18a and 18b. The command signals would be carried by wave guide 48 or other suitable means to controls 46 for actuation of fins 54.

The use of the double lobe system instead of a single lobe not only increases the accuracy but provides a sense of angular position of the vehicle. The double lobe system does not depend upon a maximum in signal strength to position the lobe axis with the radar beam as in a single lobe system, but rather upon equal signal strength to both antennas. That is, the point of maximum signal strength would be difficult to determine during a particular revolution of a missile but the point of equal signal strength to two separate antennas would be immediately ascertainable. Determining the angular position of missile 28 simply involves the detection of the signal strength to antennas 18a and 18b and determining which one is the larger. For instance, if missile 28 is not rolling and antenna 18b is receiving a larger signal than that of antenna 18a, it is known that the radar beam is incident on lens 10 from the general direction of line 36. If missile 28 is rolling, then the angular direction of deviation and roll error can be determined in a similar manner.

This invention is not restricted to the particular missile receiving equipment that has been shown in the figures. Wave guide 48 and controls 46 have been shown in the figures only as a matter of illustration purposes and other structure can be employed for accomplishing the same result.

In one particular test in which satisfactory results were attained each antenna was fabricated from a RG 52/u wave guide and bent to fit the lens. A number of longitudinal slots were cut into the broad face of the guide; the slots being alternately located on either side of the guide center line. The dimensions of each slot were made 0.56″ x 0.0625″. The beam width of the antennas was made to be 110° in the elevation plane. The two receieving beams generated in the azimuth plane each had a width of approximately 6°. The above tolerances and specifications have been included to enable one to better understand the invention and are not intended to be limiting of the invention described above or in the appending claims.

The principles of the invention as explained in connection with a specific exemplification thereon will suggest many other applications and modifications of the same. It is accordingly desired that, in construing the breadth of the appended claims, they shall not be limited to the specific details shown and described in connection with the exemplification thereof.

We claim:

1. An electromagnetic wave device comprising a microwave lens for focusing electromagnetic energy, means for detection of said energy, and a strip of material secured between said means and said lens for reflection of a portion of the energy focused by said lens and conduction of the remaining portion to said means.

2. A device as in claim 1 wherein said lens is spherical and has a refractive index variable with respect to the radius thereof.

3. A device as in claim 2 wherein said strip has predeterminable dielectric characteristics for controlling the ratio of the intensity of the reflected to that of the conducted energy.

4. A wide angle microwave reflecting and receiving device comprising a Luneberg lens sphere, a dielectric strip disposed for intimate contact with a portion of the surface of said sphere for separation of said microwaves into reflected and received waves, the change in ratio of the intensity of the reflected to that of the received waves being responsive to the values of the dielectric constant of said strip, means disposed adjacent said strip for detecting said received waves.

5. A device as in claim 4 wherein said lens is disposed for convergence of said microwaves to said strip and divergence of said reflected waves away from said strip, the convergence and divergence being equal in magnitude.

6. A device as in claim 5 wherein said means includes a pair of slotted wave guide antennas.

7. A device as in claim 4 wherein said means for detecting said waves is a waveguide bent to fit the surface of said sphere and having a plurality of slots formed in the broad face of said waveguide, said slots being alternately located on either side of the waveguide center line.

References Cited in the file of this patent
UNITED STATES PATENTS

| | | |
|---|---|---|
| 2,580,921 | Iams | Jan. 1, 1952 |
| 2,866,971 | Kelleher | Dec. 30, 1958 |
| 2,875,439 | Berkowitz | Feb. 24, 1959 |
| 2,921,305 | Cole et al. | Jan. 12, 1960 |
| 3,039,098 | Bickmore | June 12, 1962 |
| 3,067,420 | Jones et al. | Dec. 4, 1962 |